Figure 1:
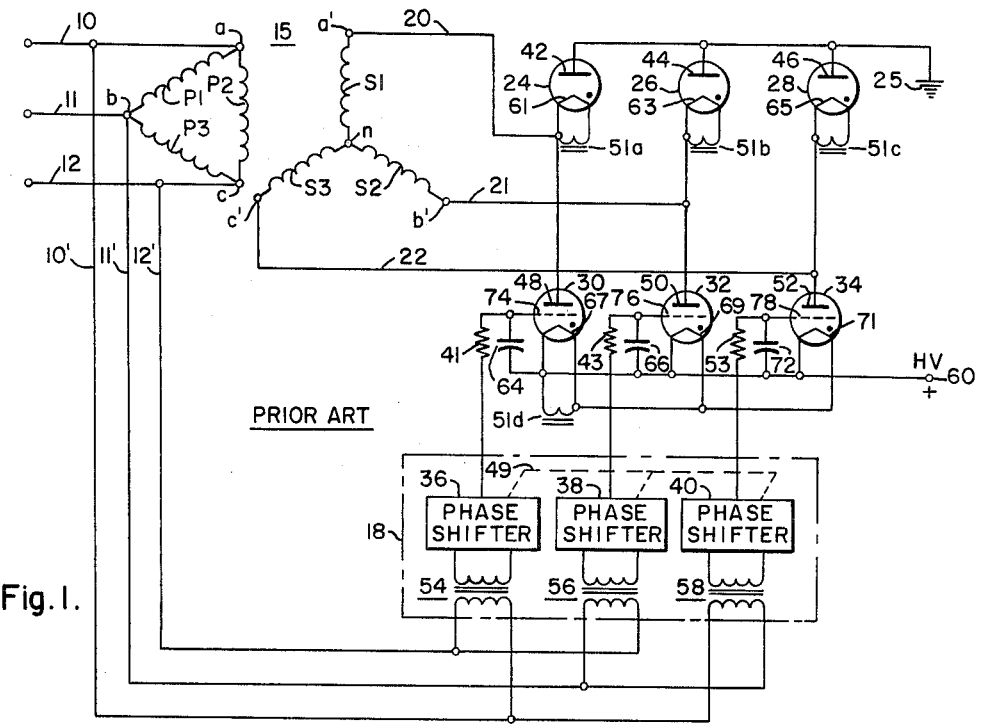

Oct. 5, 1965

R. H. BAKER 3,210,640

PHASE SHIFT CIRCUIT

Filed May 1, 1962

WITNESSES:
Bernard R. Gieguey
William L. Gates

INVENTOR
Robert H. Baker

BY
Ernest P. Klipfel
ATTORNEY

3,210,640
PHASE SHIFT CIRCUIT

Robert H. Baker, Baltimore, Md., assignor to Westinghouse Electric Corporation, East Pittsburgh, Pa., a corporation of Pennsylvania
Filed May 1, 1962, Ser. No. 191,607
7 Claims. (Cl. 321—40)

This invention relates to control circuitry and more particularly to a control circuit for a thyratron controlled high voltage rectifiers.

In the art of controlled rectification of alternating current power where grid controlled gaseous rectifiers, or thyratrons, are utilized to perform the required control, present usage conventionally provides for apparatus which feeds an alternating current control voltage to the grid electrode which is lagging in phase with respect to the excitation voltage applied to the plate or anode electrode. By so doing the period or the portion of the complete cycle over which the gaseous rectifier will conduct will be determined by the phase angle of the control voltage with respect to the excitation voltage applied. If the grid control voltage lags but is very nearly in phase with the excitation voltage the thyratron will conduct over substantially 180° or one-half of a complete cycle of the excitation voltage.

In order to provide the necessary phase shift to control thyratron rectifiers a phase shifting circuit capable of providing a phase lag with respect to the excitation voltage must be provided. Prior art apparatus presently in operation generally obtain the necessary voltage to energize the desired phase shifting device from the primary side of the power supply line. Since the cathode terminals of the thyratrons are off ground by the high voltages of the secondary winding and whereas the primary power supply is off ground potential by only a few hundred volts, high voltage isolation transformers must necessarily be provided either before or after the phase shift network.

It is an object of the present invention therefore, to provide an improved phase shift apparatus for thyratron controlled high voltage rectifiers.

Another object of the present invention resides in the provision of a phase shift device for shifting the phase of the voltage applied between the grid and plate or cathode electrodes of a grid controlled gaseous rectifier in a thyratron controlled high voltage rectifier system.

Still another object of the present invention resides in the provision of phase shifting apparatus for a thyratron controlled high voltage rectifier which eliminates isolation transformers between the primary power supply and the required phase shift device.

And yet another object of the present invention is the provision of a phase shift control apparatus for gaseous controlled rectifiers used in high voltage rectification systems in which the inherent problems of phasing and possible misconnection is substantially reduced.

Figure 2:
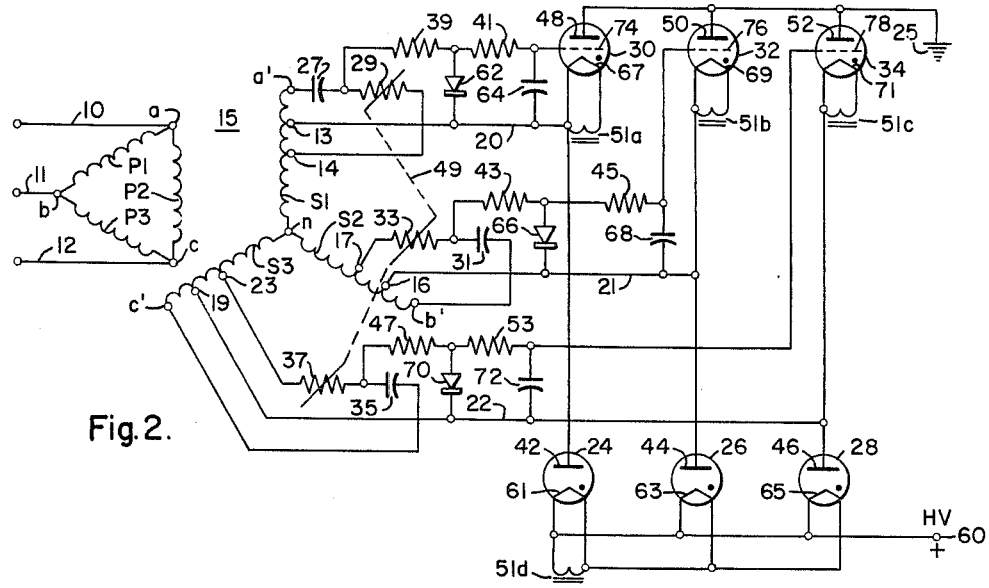

Other objects and advantages of the present invention will become apparent from the following description when taken in connection with the accompanying drawings in which:

FIGURE 1 is a schematic drawing of a typical high voltage rectification system illustrative of the prior art; and FIG. 2 is a schematic diagram illustrating the preferred embodiment of the present invention.

The vacuum tube, although providing excellent control of current flow, is an inefficient power device that can operate only at relatively large anode voltages. In the field of power electronics where close control of alternating and rectified current is required as in welding, induction heating, lighting control, motor control, and voltage regulation, gaseous control tubes perform this operation efficiently and with relatively low applied voltages. One type of gaseous control tube is the grid controlled rectifier commonly called the thyratron. The thyratron meaning "door tube" was developed from the hot cathode gas diode by the addition of a large grid structure to form an almost complete electrostatic shield between cathode and anode. By placing proper potentials on the grid, the starting of the anode current may be controlled, thereby increasing the usefulness of the gas tube.

In a thyratron, the grid has a one-way control of conduction, and serves to fire the tube at the instant that it reaches a critical voltage. Once the tube is fired, current flow is generally determined by the external circuit conditions; the grid then has no control, and plate current can be stopped only when the plate voltage drops to zero.

Because of the almost complete shielding of the cathode from the anode by the grid and the closeness of the grid to the cathode, small negative voltages on the grid can suppress the effects of much larger positive voltages on the anode. A few volts negative on the grid may prevent the starting of the arc heating with several hundred or several thousand volts on the anode. The grid does not have gradual control of the current, as in the case in a vacuum triode; if the grid is more negative than a critical value no current flows; if the grid is less negative than this critical potential conduction takes place. The value of grid voltage which just prevents ignition of the arc in a thyratron is called the critical grid potential.

When a thyratron is operated with an alternating current (A.C.) voltage, it is desired that the grid have control of the starting time in each cycle. To achieve this it is necessary that the grid sheath be completely dissipated during the negative half cycle of anode voltage or that the deionization time of the tube be less than one-half cycle of the A.C. voltage applied. This fixes an upper frequency limit for thyratron operation.

When an A.C. voltage is applied to the anode of a thyratron, the arc is extinguished on each negative half cycle, and the grid may reinitiate the arc at any desired time in each succeeding positive half cycle.

The average value of the anode current may be varied from an upper limit where conduction takes place over 180° of the positive half cycle of anode voltage to 0° by varying the firing or ignition angle which is determined by changing the phase angle between the voltage applied to the anode and the control voltage applied to the control grid.

Thyratron control circuits then must provide a simple means of shifting the point in the cycle at which the grid becomes more positive than the critical grid voltage. Three basic control circuits are normally used to provide the necessary control over the firing and consequently the average value of the anode current. These are: bias or amplitude control, phase shift control, and a combination of bias and phase control.

The instant invention concerns the phase shift control method. This involves applying an A.C. control voltage to the grid with the phase of this voltage being variable with respect to the anode voltage. Of the various phase shifting circuits used, the most common configuration is the simple resistance and capacitance or resistance and inductance combination where one or both elements are variable. However, there are capacitor-transformer phase shifting devices and electrically controlled phase shifting circuits which vary the resistance or inductance electrically. Another simple device for varying the phase of an A.C. voltage is the self-synchronous motor. And yet another circuit for producing a phase shift is a phase shift bridge where reactances of the same type are used in adjacent legs of the bridge circuit.

Referring now to the drawings in which the same reference numerals and letters indicate identical parts in the various showings, the embodiment illustrating the typical prior art is shown in FIG. 1. The circuit illustrated therein is a three phase full wave rectification system employing three gaseous diodes 24, 26 and 28 and three control tubes 30, 32, and 34 of the thyratron type supplying a high voltage output terminal 60 at the common connection of the cathode electrodes 67, 69, and 71 of the thyratrons. The thyratrons 30, 32, and 34 are connected to the secondary windings S1, S2, and S3 of the three phase transformer 15 with each of these windings having a first and second end, one end of each winding being defined by the terminals or taps, a', b' and c' for windings S1, S2 and S3, and the other end being defined by the terminal, or tap, n. The control phase shifters 36, 38 and 40 are excited from the primary side of the three phase line 10, 11 and 12. As a result of this connection there is necessarily required three isolation transformers 54, 56 and 58. The isolation transformers are necessary because as has been said before the thyratron control tubes 30, 32 and 34 are above ground reference potential by the amount of the high voltage developed in the secondary windings S1, S2, and S3 whereas the primary windings P1, P2 and P3 of the power supply are at a relatively lower voltage.

It would be well to consider a typical current flow path in FIG. 1 at any one instant.

Since the secondary windings S1, S2, and S3 are connected in a three-wire Y-circuit the current flow at any given time must be considered in view of a pair of windings such as secondary windings S1 and S2 taken in combination. Assuming that the polarity of voltage at the terminal a' is positive and the common interconnection n being negative, the terminal b' of secondary winding S2 will be negative with respect to terminal a'. Since terminal a' is connected by means of line 20 to both the cathode 61 of diode 24 and the plate electrode 48 of thyratron 30, the thyratron 30 will conduct in combination with diode 26. Diode 26 is connected to terminal b' by line 21 which in turn is connected to the cathode terminal 63. The current path established will be from terminal a' through the thyratron 30 to the high voltage output terminal 60 from whence it would pass through any convenient load, not shown, connected between terminal 60 to a point of common reference potential 25 back through the diode 26 and thence through secondary windings S2 and S1. In like manner depending upon the polarity of any pair of secondary windings, a corresponding combination of a thyratron and a diode will conduct in succeeding time intervals to continually provide a D.C. current through the load, not shown. For a more complete understanding of the operation of the three phase full wave rectifier action, attention is directed to Electronic Engineering Principles by John D. Rider, Prentice Hall, Incorporated, 1950, page 300.

The phase shifters 36, 38 and 40 are ganged together by means of suitable mechanical coupling to provide the same settings on all three phase shift networks. It should be noted however, that the prior art apparatus inherently involves technical difficulties of correctly phasing the system at start-up and during maintenance due to the possibility of misconnections and phase reversals easily associated with the isolation transformers 54, 56 and 58. The present invention, however, overcomes the inherent problems of phasing and provides a relatively inexpensive and improved system for controlling the thyratrons utilized in control circuits as illustrated in FIG. 1.

Referring now to FIG. 2, the applicant eliminates the need for the previously required isolation transformers by utilizing the secondary windings S1, S2, and S3 themselves for the excitation of the phase shift device as well as for the excitation of the control tube thyratrons.

In the preferred embodiment of the present invention three capacitance-resistance phase shift networks are respectively connected to each leg of the three phase secondary windings such that capacitor 27 and adjustable resistor 29 are connected in series to a first and second point on the secondary winding defined by auxiliary taps 14 and a' located adjacent the end of winding S1; capacitor 31 and adjustable resistor 33 are connected in series across secondary winding S2 at auxiliary taps 17 and b'; and capacitor 35 and adjustable resistor 37 are connected in series across secondary winding S3 at auxiliary taps 23 and c'. Adjustable resistors 29, 33 and 37 are ganged together to provide a uniform simultaneous adjustment of all three networks. The capacitor-resistor combinations are connected across only a portion of the respective secondary windings, which portion is less than the entire winding, and the voltages appearing at the common connection between the capacitor and the resistor of the three capacitor resistor combinations are fed to appropriate thyratrons and diode combinations by means of a direct resistive, or ohmic, connection. Another portion of each secondary winding is connected to appropriate cathodes of the control tube thyratrons.

Considered in detail, upon application of line voltage to terminals a, b and c, the voltage appearing at the common connection between capacitor 27 and adjustable resistor 29 is fed to the control grid electrode 74 of thyratron 30 by means of grid current limiting resistors 39 and 41 to provide a control voltage. This control voltage is lagging in phase with respect to the voltage between main taps 13 and n, main tap 13 being connected to the cathode 67 of thyratron 30 by means of lead 20. By adjustment of the variable resistor 29 the phase shift can be varied between approximately 15° when the resistance is a maximum to 180° when the resistance is equal to zero thereby providing a range of variation of substantially 165°. A representative value for the capacitor 27 would be 1 microfarad and the adjustable resistor 29 would have the range of 0 to 10,000 ohms. Further a capacitor 64 is connected between control grid 74 and cathode 67 to provide a by-pass for undesired input signals and a clipping diode 62 is connected between the common connection of resistors 39 and 41 to lead 20.

Secondary windings S2 and S3 have identical connections as that of secondary winding S1. The phase shift network comprising capacitor 31 and adjustable resistor 33 are connected to auxiliary taps b' and 17 respectively. The voltage at the common connection between capacitor 31 and adjustable resistor 33 is fed to the control grid 76 of thyratron tube 32 by means of grid current limiting resistors 43 and 45. By-pass capacitor 68 is connected between the control grid 76 and the cathode 69; likewise clipping diode 66 is connected between the common connection of resistors 43 and 45 to the lead 21 which connects main tap 16 to the cathode 69.

The third phase shift network including capacitor 35 and resistor 37 is connected in series to auxiliary taps c' and 23 respectively. The phase control voltage appearing at the common connection of capacitor 35 and adjustable resistor 37 is applied to the control grid 78 of thyratron 34 by means of resistors 47 and 53. Again a by-pass is provided across the grid 78 and cathode 71 by means of capacitor 72. Also diode clipper 70 is provided between the common connection of resistors 47 and 53 to lead 22 which connects excitation voltage from main tap 19 of secondary winding S3 to cathode 71. Common tap n forms a second main tap for each of the windings S1, S2 and S3.

In the preferred embodiment shown in FIG. 2 the control thyratrons 30, 32 and 34 have their respective plate electrodes 48, 50 and 52 connected to a point of common reference potential 25. The point of common reference potential is illustrated as a ground terminal. The cathode 67, 69 and 71 of thyratron control tubes 30, 32 and 34 are connected to the anode electrodes 42, 44 and 46 respectively of gas rectifier tubes 24, 26 and 28. The cathodes 61, 63 and 65 of the aforementioned gas rectifiers are connected to a common high voltage output terminal 60 wherein a suitable load, not shown, can be connected between terminal 60 and the ground connection 25.

Suitable cathode heater voltage is provided to the rectifier tubes 24, 26 and 28 by means of a filament transformer winding 51d. Likewise cathode heater voltage is applied to the three thyratron control tubes 30, 32 and 34 by means of filament transformer windings 51a, 51b and 51c.

It should be observed that the thyratron tubes 30, 32 and 34 in the preferred embodiment are connected on the ground side or low voltage side of the rectifier system with the rectifier tubes 24, 26 and 28 connected to the high voltage side of the system. By tying the respective plate electrodes of the thyratrons to ground 25 and observing voltages with respect to ground, the control tubes appear to operate only on the negative half cycle of the excitation voltage applied from the respective secondary windings, however, considering the circuit as a closed loop it will operate exactly as described for the prior art apparatus described in FIG. 1. The control voltage applied to grids 74, 76 and 78 from the respective capacitor resistor phase shift networks is still made to lag the excitation voltage applied from main taps 13, 16 and 19 to cathodes 67, 69 and 71 respectively. The polarity of the clipping diodes is shown to clip the positive portion of the shifted A.C. control voltage in order to prevent any unwarranted misfirings of the control tubes. The current paths in the instant invention are identical to those illustrated in the prior art embodiment shown in FIG. 1.

It should be noted that the thyratron connection as shown in FIG. 2 is preferred merely for the sake of more easily overcoming high voltage insulation problems inherently associated with the subject apparatus. The preferred embodiment is illusrated for purposes of illustration only and is not meant to be considered in a limiting sense. It would also be possible to drive the control thyratrons 30, 32 and 34 on the high voltage side of the system by interchanging the placement of the thyratrons and the rectifier tubes as illustrated in FIG. 1. It was merely for the sake of convenience that the interchange of position between the thyratrons and the rectifier tubes was made in the instant case. Also it is not meant that the subject invention should be limited to a three phase system but is meant to include a single phase rectifier system as well. The phase shift network can just as easily be connected across a portion of the secondary winding of a single phase rectifier system as well as that shown herein.

In summation therefore, the present invention consists in placing the desired phase shifting apparatus directly across a portion less than the whole, of the secondary winding of the power transformer which is used to excite the entire rectifier circuit. The voltage appearing across that portion of the transformer is shifted in phase with respect to the center tap of said portion of the winding and is applied to the control grid of the thyratron and the center tap itself is connected to either the cathode or plate of the thyratron depending on the arrangement desired, to provide the required excitation voltage. As has been said before the present invention is not meant to be limited to a three phase system but can be utilized with a single phase system as well and in addition the thyratrons can be driven from either the low voltage or ground side as indicated or from the high voltage side as shown in the prior art depending upon the demands of the specific application.

Whereas apparatus providing an improvement in providing for a phase shift network for thyratron controlled high voltage rectifiers has been shown and described with respect to a preferred embodiment thereof, which gives satisfactory results, it should be understood that changes may be made and equivalents substituted without departing from the spirit and scope of the invention.

I claim as my invention:

1. A phase control circuit for a thyratron rectifier having a cathode, grid and anode electrode, comprising: a power transformer including at least one secondary winding having a first end and a second end; phase shifting means including at least one reactive impedance and at least one resistive impedance operably connected in series, with one of said impedances connected to one of said ends of said secondary and the other of said impedances connected to said secondary at a point closer to said one end than the other of said ends; ohmic connection means directly connecting said phase shifting means to said grid electrode of said thyratron; circuit means connected from said secondary winding to another electrode of said thyratron for providing a voltage leading in phase with respect to the voltage applied to said grid electrode; and return circuit means operably connected to the other electrode of said thyratron back through said secondary winding for completing a current path.

2. A control apparatus for grid controlled gaseous rectifiers comprising in combination: a power transformer including at least one secondary winding; a phase shift network including a resistance and a reactive impedance connected in series circuit combination across a portion of said one secondary winding said portion constituting less than the entire said secondary; a grid controlled gaseous rectifier; resistance means directly connecting the common connection of between said resistance and said impedance to the control grid of said grid controlled rectifier; means for connecting another portion of said one secondary winding to another electrode of said grid controlled rectifier; and circuit means for forming a current return path operably connected to still another electrode of said rectifier back to said another portion of said secondary winding.

3. A phase control circuit for a thyratron rectifier circuit comprising: a transformer having a plurality of secondary windings; thyratron rectifiers having a plate, a grid, and a cathode; a phase shift network for each thyratron rectifier having at least one variable impedance, each said network being connected across a respective first portion of said secondary windings said first portion being less than the entire said secondary; ohmic connection means for connecting voltages shifted in phase with respect to voltages appearing across said secondary windings, from each said phase shift network directly to respective grids of said rectifiers, means for connecting a second portion of said secondary windings to respective plates of said rectifiers; and means connected to said cathodes to form a current return path back to said secondary windings.

4. A phase shift control circuit for a three-phase full wave rectifier utilizing grid controlled gaseous rectifiers comprising: a three-phase transformer having a plurality of primary and a plurality of secondary windings, said secondary windings being interconnected in predetermined circuit combination; a plurality of variable phase shift networks, each said network being connected to a portion of a respective one of said secondary windings, said portion being less than the entire winding; at least three control electron tubes comprising grid controlled gaseous rectifiers each having a control grid; ohmic means directly connecting each of said phase shift networks with respective control grids of said gaseous rectifiers for applying a predetermined phase control voltage to said control grids; circuit means for connecting respective secondary windings to another electrode of said grid controlled gaseous rectifiers; and means connected to still another electrode of each of said grid controlled gaseous rectifiers for providing a current return path to respective legs of said secondary windings.

5. A phase shift control circuit for thyratron rectifiers comprising in combination: a three-phase transformer having a plurality of primary and secondary windings, said secondary windings being connected in a predetermined circuit combination, and each having a first and second end; three variable phase shift networks each including a resistive and a reactive circuit element, said networks being separately connected to individual ones of said secondary windings at a first and second point adjacent an end thereof; three thyratron control electron tubes each having two electrodes and a control grid with one of said electrodes operably connected to a respective one of said secondary windings at a point intermediate said first and second point for receiving an excitation voltage therefrom; plurality of ohmic connections each directly connecting a respective one of said phase shift networks with a respective one of said control grids of said thyratrons for applying a predetermined phase control voltage thereto, said control voltage lagging in phase with respect to said excitation voltage; and circuit means connected to the other said electrode of each of said thyratrons for providing a three phase current return path to the other said ends of said secondary windings.

6. An electric rectifier circuit comprising: a transformer winding including spaced main taps and spaced auxiliary taps, with one of said main taps being interposed between said auxiliary taps; a phase shifting circuit having first and second connected impedances each of said impedances being connected to a respective one of said auxiliary taps; circuit means connected between said main taps and including a thyratron having first and second electrodes and a control grid, with one of said electrodes connected to one of said main taps and the other of said electrodes connected to the other of said main taps through means including load means; and an ohmic connection directly connecting said phase shifting circuit to said control grid.

7. An electric rectifier circuit comprising: a transformer including a plurality of secondary windings each winding having first and second spaced main taps and first and second spaced auxiliary taps with one of said main taps being interposed between said first and second auxiliary taps; a plurality of phase shifting networks each including a first and second impedance serially connected, each said first impedance being connected to a respective one of said first auxiliary taps and each said second impedance being connected to a respective one of said second auxiliary taps; a plurality of thyratrons each having an anode, grid, and cathode electrode, said anode electrodes being commonly connected to a point of low reference potential, each cathode electrode being connected to a respective one of said first main taps; a plurality of ohmic connections each connecting the common point between said first and second impedance to a respective one of said control grids; a high voltage terminal; and circuit means operatively connecting each of said second main taps to said high voltage terminal.

References Cited by the Examiner
UNITED STATES PATENTS

| | | | |
|---|---|---|---|
| 2,001,836 | 5/35 | Craig | 321—38 |
| 2,235,551 | 3/41 | Garman | 321—40 |
| 2,443,658 | 6/48 | Kratz | 321—38 |

FOREIGN PATENTS

| | | |
|---|---|---|
| 41,768 | 1/33 | France. |

MAX L. LEVY, *Primary Examiner.*